United States Patent Office 3,035,888
Patented May 22, 1962

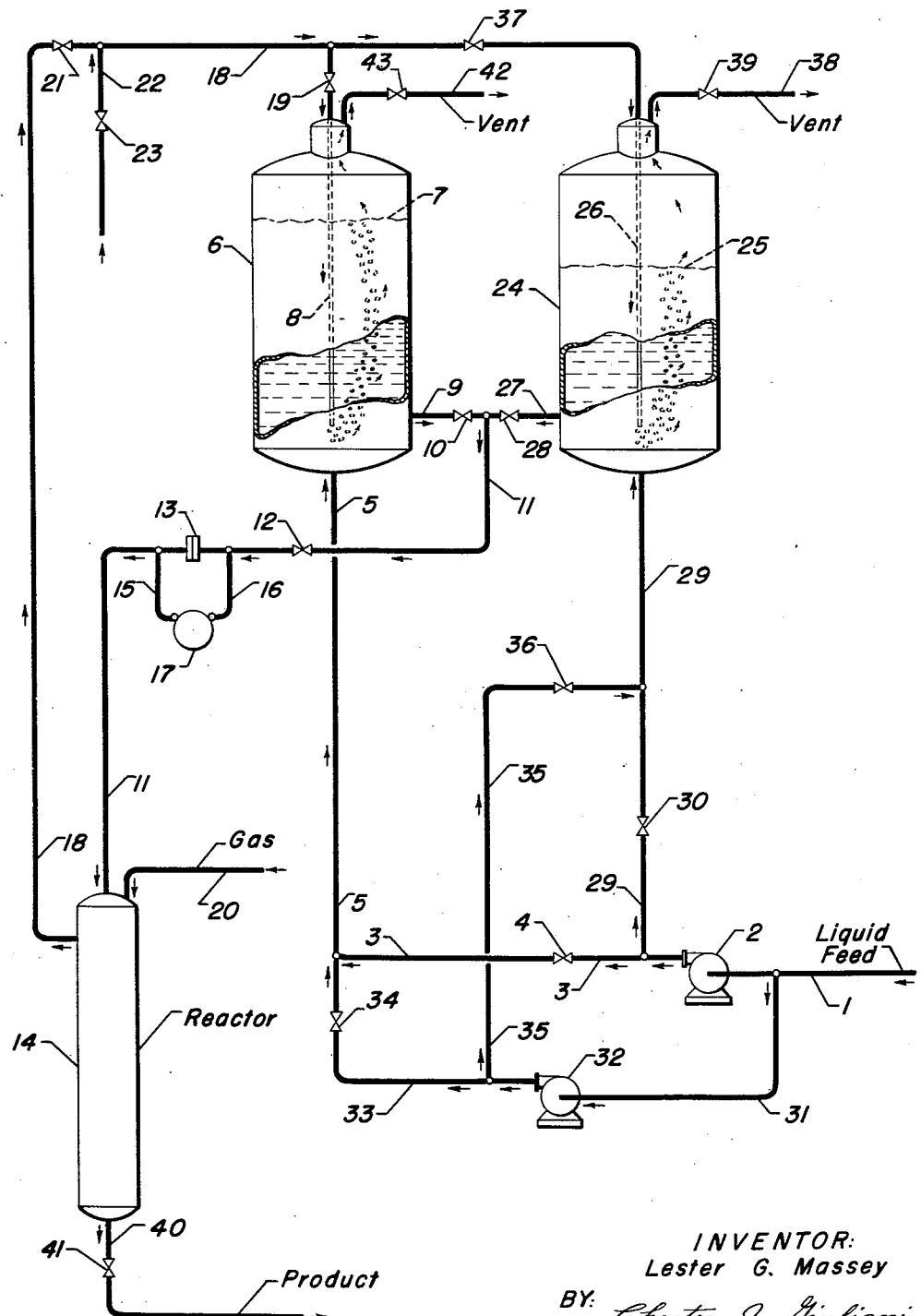

3,035,888
PROCESS AND APPARATUS FOR OBTAINING A
CONSTANT HEAD OF LIQUID
Lester G. Massey, Arlington Heights, Ill., assignor to Universal Oil Products Company, Des Plaines, Ill., a corporation of Delaware
Filed Oct. 31, 1960, Ser. No. 66,341
9 Claims. (Cl. 23—1)

This invention is a continuation-in-part of co-pending application Serial No. 733,158, filed May 5, 1958, now abandoned which in turn is a continuation-in-part of application Serial No. 477,343, filed December 23, 1954, now abandoned.

The present invention relates to a method and apparatus for establishing and maintaining a constant head of liquid, and is particularly directed to a means of obtaining a non-pulsating, constant flow rate of liquid at any desired pressure.

In many applications, it is desirable to maintain a liquid stream at a constant flow rate or to vary such flow rate in response to a selected process variable but independently of driving force. For example, in chemical processes wherein the proportions of material are important, or the rate of flow of liquid is important, it is desirable to have a means available which will assure a constant flow rate of liquid throughout the entire period of operation. It is likewise desirable that the constant flow rate be non-pulsating in order to avoid intermittent pressure surges and accumulation of material, the existence of which is not conducive to the treatment of all segments of the liquid stream in the same manner and to the same degree.

The present invention provides a method and apparatus for maintaining a constant-head flow over long periods of time at any desired absolute pressure without experiencing pulsations or pressure surges.

It is an embodiment of this invention to provide a method for maintaining a constant head driving force for passing a flowing liquid stream to a processing zone, which method comprises withdrawing said flowing liquid to said zone from the lower portion of a capacity vessel containing an inventory of said flowing liquid, continually introducing a gas stream substantially at the pressure of said zone to a point beneath the surface of said inventory of flowing liquid maintained within said capacity vessel, and introducing additional quantities of said flowing liquid into said capacity vessel at a rate less than the rate at which the flowing liquid is withdrawn to said zone.

In another embodiment, the present invention provides a method for maintaining a constant head driving force for passing a flowing liquid stream to a processing zone, which method comprises withdrawing said flowing liquid to said zone from the lower portion of a first capacity vessel containing an inventory of said flowing liquid, continually introducing a gas stream substantially at the pressure of said zone to a point beneath the surface of said inventory of flowing liquid in said first capacity vessel and introducing additional quantities of said flowing liquid into said first capacity vessel at a rate less than the rate at which it is withdrawn to said zone, stopping the withdrawal of said flowing liquid before the level thereof within said capacity vessel falls below the higher of the two points representing the liquid withdrawal and gas introduction and withdrawing said flowing liquid to said zone from the lower portion of a second capacity vessel containing an inventory of said liquid, continually introducing said gas at substantially the pressure of said zone, to a point beneath the surface of the inventory of liquid in said second capacity vessel, venting said first capacity vessel and filling it at least partially with additional quantities of said liquid from an independent source while said second capacity vessel provides flowing liquid to said zone.

The present invention may be best described with reference to the accompanying drawing which illustrates several embodiments thereof and which is intended to be illustrative of, rather than limiting upon, the broad scope of this invention.

The drawing illustrates a two vessel apparatus; however, it is arranged so that it may be operated as a single-vessel apparatus through manipulation of the various valves. The drawing will be explained first with reference to the single vessel, or extended time operation, and then with reference to the double vessel, or continuous operation.

Referring now to the drawing, liquid feed from line 1 is driven through pump 2 into line 3 containing valve 4. The liquid feed passes into charging line 5 which discharges into the lower portion of vessel 6. In vessel 6 an inventory of liquid is accumulated to level 7. Vessel 6 is provided with line 8 shown here as a dipleg below the liquid level 7; however, line 8 may be a line entering the side of vessel 6 discharging below the surface of the liquid maintained therein. Line 8 preferably discharges at a point in the immediate vicinity, with respect to elevation, of discharge line 9 and valve 10 which is maintained in the lower portion of vessel 6 for the purpose of withdrawing liquid. Line 9 discharges into line 11, and the flowing liquid passes through valve 12, preferably a needle or metering valve, to provide fixed flow resistance and, if desired, through flow rate indicating means 13 into the upper portion of reactor 14. Flow indicating means 13 may be attached by suitable lines 15 and 16 to indicator 17 which, if desired, may be a controlling means actuating valve 12 to maintain a constant, predetermined flow; however, this embodiment is not shown here since it is superfluous and forms no part of this invention.

When, as in the preferred embodiment, the reactor maintains a gas phase therein, it is desirable that the gas phase in the reactor be connected through line 18 to the upper portion of vessel 6 from which it is discharged through the aforementioned line 8 beneath liquid surface 7. Through this arrangement, whereby additional flowing liquid is introduced into vessel 6 at a rate less than the rate at which flowing liquid is being withdrawn from vessel 6, the elevation of liquid surface 7 is continually decreasing with respect to the higher of the two points representing the tip of dipleg 8 and the flowing liquid outlet leading to line 9. In addition, as long as the elevation of liquid surface 7 is decreasing, however minute or irregular is of no consequence, bubbles of gas will discharge from the tip of dipleg 8 in order to compensate for the ever-diminishing volume of liquid in vessel 6. This is one of the essential features of my invention; that is, that surface level 7 is continually decreasing, or, conversely, gas bubbles are constantly being emitted from the tip of dipleg 8.

When bubbles are discharging from the lower portion of line 8, the pressure at the tip thereof, at which the bubbles are discharging, is substantially equal to the pressure in the upper portion of reactor 14. Therefore, in view of this equalization of pressures, the only driving force effecting the flow of liquid through lines 9 and 11 is the liquid head resulting from the difference in elevation between the point where line 8 discharges into the bottom of vessel 6 and the upper portion of reactor 14. This elevation difference, or liquid-head differential, is maintained constant regardless of the particular losses of level 7, whether in the upper portion of vessel 6 or in the lower portion, and regardless of the fact that level 7 is decreasing, and regardless of the rate at which it is decreasing. It is essential, however, that surface level 7 does not drop below the tip of dipleg 8 or below the elevation of line 9. Therefore, the driving force causing liquid flow is constant regardless of inventory, absolute pressure, etc., and results in a constant non-pulsating rate of flow of said liquid.

In accordance with the present invention, pump 2 is charging liquid feed to vessel 6 at a rate less than the rate at which liquid is being withdrawn through lines 9 and 11 to reactor 14. Therefore, level 7 is continuously dropping, but at an exceedingly slow rate so that the period of time it takes to empty vessel 6 is extremely log. The rate at which the liquid feed is added to vessel 6 may be 90% or even 99%, or even 99.9% of the rate at which liquid is being discharged through lines 9 and 11; the effective capacity, or volume, of vessel 6 may, through this arrangement, be magnified 99-fold or more. It is apparent that the difficulty normally associated with maintaining the constant flow rate from a pump is eliminated by the method of this invention as well as eliminating the difficulty associated with pulsating or surging flow when a reciprocating pump is used. The only requirement for the pump in the present invention is that it discharge liquid into vessel 6 at a rate less than the rate at which liquid is withdrawn. Temporary failure of the pump will not effect the cessation of the process, but will merely diminish the total period of time before vessel 6 becomes empty.

When the reaction in reactor 14 does not contain a gas phase such as a gaseous reactant introduced through line 20, or the vapor of the liquid feed, the pressure equalizing gas may not be obtained from the process. Valve 21 maintained in line 18 may then be closed and an extraneous gas source may be employed for the purpose of introducing gas through line 22 and valve 23. This extraneous gas may be pressure regulated so that it is at the pressure of the reactor thereby flowing only when surface level 7 is decreasing. It may be seen that the expense of using an extraneous gas will be small since the total volume of gas used will be equal only to the capacity of vessel 6. It is contemplated that the discharge point in line 8 will contain a restriction or will be drawn to a fine tip so that the gas entering through line 8 may be bubbled slowly and at a continuous rate. When the process is operated at atmospheric pressure, the extraneous gas may be air supplied to the capacity vessel by merely opening line 8 to the atmosphere. The use of an extraneous gas source may afford a means of pressure regulation for the process when valve 41 in the reactor exit line 40 is set for constant flow rate.

To make the process provided by the method of the present invention continuous, a second capacity vessel 24 may be added. Said second vessel contains surface level 25 of the flowing liquid and line 26, the tip of which discharges below said surface level. It is essential that the discharge point of line 26 be at the same elevation, with respect to a common point such as the top of reactor 14, as the discharge point of line 8. Line 27 and valve 28 are provided for discharging liquid from vessel 24 into the aforementioned line 11. It may be seen from the drawing that by closing valve 4 and opening valve 30, liquid feed passing from pump 2 and line 3 will flow through line 29 into the lower portion of vessel 24 at a rate slightly less than the withdrawal rate of liquid therefrom. This flow is employed when liquid is being withdrawn from vessel 24.

In the preferred operation of this invention, when liquid is being withdrawn from one of the two vessels 6 or 24, the other will be in the process of being filled. This is readily accomplished through the withdrawal of liquid feed from line 1, passing it through line 31 and pump 32 and through either line 33 and valve 34 or line 35 and valve 36 whichever is appropriate. Pump 32 may operate at any rate as long as it runs fast enough to fill vessel 6 or 24 in the time required to empty the other.

During operation, when vessel 24 is discharging liquid to reactor 14, valve 37 maintained in line 18 will be opened while valve 19 maintained in line 3 will be closed so that the gas phase coming from either reactor 14 or from the extraneous source through line 22 will be passed through line 26 below the surface 25 in vessel 24. When vessel 24 is being filled by means of pump 32, line 35 and line 29, valve 37 will be closed and valve 39 will be open so that the gas phase in the upper portion of vessel 24 may be discharged through line 38. Similarly, when vessel 6 is filling via line 31, pump 32, line 33 and line 5, valve 19 will be closed, and valve 43 opened so that the gas phase entrapped in vessel 6 may be vented through line 42. The provision of gas vents 43 and 39 is essential to the efficient operation of the apparatus in accordance with the present invention, since capacity tanks 6 and 24 cannot be refilled, when required, without releasing the gas entrapped therein. It should be noted that such gas vents are required whether the apparatus comprises a single capacity vessel, or a plurality of the same. It may thus be seen that with this arrangement, a constant head flow of liquid may be effected through line 11 to the upper portion of reactor 14 for an indeterminable length of time by intermittently using vessel 6 and vessel 24 as the source of such flowing liquid. It may likewise be seen that there is no necessity for interruptions of flow when switching vessels since the same flow rate and liquid head will be obtained whether valve 10 or valve 28, or both, are open so that liquid may discharge from one one, the other or both of vessels 6 or 24. The manipulation of valves to obtain flow from either vessel is simple and may be done without haste, or interruption of the flow; if desired, the valves can be automatically operated by a master control system.

It will be apparent, first, that various modifications may be made to the apparatus of this invention without effecting its utility and operability; and, secondly, that the general method of the invention may be applied to a great variety of continuous flow processes. For example, reactor 14 may instead be a vapor-liquid contacting apparatus such as a fractionating tower, absorber column, stripper column, etc. or a liquid-liquid contacting apparatus such as a solvent extraction tower, scrubbing tower, and the like, or a liquid-solid contacting apparatus such as a feed drier, bauxite tower, catalytic reactor, etc., or a fired heater or heat exchanger, or mechanical liquid separation means such as a centrifugal separator or cyclone. The generic terms "processing zone" and "processing chamber," as used in the appended claims, are thus intended to connote any such enclosed zone or apparatus, be it a reaction zone, heat transfer zone, mechanical separation zone, liquid-vapor contacting zone, liquid-liquid contacting zone, liquid-solid contacting zone, etc., for which it is desired to maintain a constant flow rate of liquid feed thereto.

It is further obvious that means other than mechanical pumps 2 and 32 may be employed to fill capacity vessels 6 and 24. For example, both pumps may be replaced by a single liquid reservoir maintained under sufficient pressure, as by a gas cylinder, to force liquid to flow through lines 5 and 29 into the vessels 6 and 24, respectively; or such liquid reservoir may be disposed at a higher elevation than capacity vessels 6 and 24, and the liquid introduced to these vessels by gravity feed flow alone or in combination with pressure-induced flow; insofar as mechanical pumping means may be employed, it is also within the scope of this invention to use only a single pump such as pump 2 and, through proper manipulation and throttling of valves 4 and 30, pump 2 can be used to fill either vessel 6 or vessel 24, whichever is currently "off-stream," and at the same time furnish the reduced flow addition liquid to the "on-stream" vessel. The term "source of liquid" as used in the appended claims is thus intended to connote any such independent source of liquid, whether it be a pump, plurality of pumps, a liquid reservoir under pressure, or gravity leg, etc., which source of liquid provides at least sufficient driving force as to cause liquid to pass into the capacity vessels upon opening their respective liquid inlet conduits.

The apparatus, as herein described, may be supplemented with additional equipment such as pressure, temperature, flow rate or liquid level controlling and indicating means, wherever these devices are appropriate. The selection of additional equipment will depend upon the particular process being effected, and may be varied according to specific needs.

I claim as my invention:

1. The method of providing a constant-head driving force for passing a flowing liquid stream to a processing zone which comprises withdrawing said flowing liquid to said zone from the lower portion of a capacity vessel containing an inventory of said liquid, continually introducing a gas stream, substantially at the pressure of said zone, to a point beneath the surface of said inventory of flowing liquid in the capacity vessel and introducing additional quantities of said flowing liquid into said capacity vessel at a rate less than the rate at which the flowing liquid is withdrawn to said zone.

2. The method for providing a constant-head driving force for passing a flowing liquid stream to a processing zone which comprises withdrawing said flowing liquid to said zone from the lower portion of a first capacity vessel containing an inventory of said flowing liquid, continually introducing a gas stream, substantially at the pressure of said zone, to a point beneath the surface of said inventory of flowing liquid in the capacity vessel, introducing additional quantities of said flowing liquid into said capacity vessel at a rate less than the rate at which the flowing liquid is withdrawn to said zone, stopping the withdrawal of said flowing liquid before the level thereof within said capacity vessel falls below the higher of the two points representing the liquid withdrawal and gas introduction and withdrawing said flowing liquid to said zone from the lower portion of a second capacity vessel containing an inventory of said liquid, introducing said gas, at substantially the pressure of said zone, to a point beneath the surface of the inventory of liquid in said second capacity vessel, venting said first capacity vessel and filling it at least partially with additional quantities of said liquid from an independent source while said second capacity vessel provides said flowing liquid to said zone.

3. The process of claim 1 further characterized in that said gas, substantially at the pressure of said zone, comprises gas passed directly from said zone to a point beneath the surface of said inventory of flowing liquid.

4. The method of claim 2 further characterized in that the gas introduction points, whereby said gas discharges beneath the surface of the flowing liquid maintained within each of said capacity vessels, are at the same elevation.

5. An apparatus for obtaining constant-head driving force in a flowing liquid stream comprising a pair of vessels each having a liquid outlet in the lower portion thereof, a liquid inlet, and a gas vent in the upper portion thereof, a gas inlet conduit terminating in the lower portion of each of said vessels and at the same elevation in the respective vessels, a processing chamber at a lower elevation than said vessels and having an inlet line, valved conduit means connecting said liquid outlets to said inlet line, means for supplying to said gas inlet conduits a gas at substantially the pressure of said processing chamber, valved conduit means connected to both of said liquid inlets, and means for forcing liquid through the last-named valved conduit means into said vessels.

6. The apparatus of claim 5 further characterized in that said gas inlet conduits are connected to said processing chamber.

7. The apparatus of claim 5 further characterized in that said processing chamber is a reactor.

8. The apparatus of claim 5 further characterized in that said means for forcing liquid comprises a mechanical liquid pump.

9. An apparatus for obtaining constant-head driving force in a flowing liquid stream comprising a pair of vessels each having a liquid outlet in the lower portion thereof, a liquid inlet, and a gas vent in the upper portion thereof, a gas inlet conduit terminating in the lower portion of each of said vessels and at the same elevation in the respective vessels, a processing chamber at a lower elevation than said vessels and having an inlet line, valved conduit means connecting said liquid outlets to said inlet line, means for supplying to said gas inlet conduits a gas at substantially the pressure of said processing chamber, a pair of mechanical liquid pumps, and valved conduit means connecting each of said pumps to both of said liquid inlets.

References Cited in the file of this patent

UNITED STATES PATENTS 2,899,969    Kirby _____ Aug. 18, 1959

FOREIGN PATENTS 672,047    Great Britain _____ May 14, 1952